United States Patent [19]

Saitoh et al.

[11] Patent Number: 5,274,722
[45] Date of Patent: Dec. 28, 1993

[54] HOUSING STRUCTURE FOR PLUG-IN TYPE CONNECTOR FOR OPTICAL FIBERS

[75] Inventors: Masahiko Saitoh; Kiyonori Kusuda, both of Kawasaki, Japan

[73] Assignee: Fujitsu Limited, Kawasaki, Japan

[21] Appl. No.: 920,902

[22] Filed: Jul. 28, 1992

[30] Foreign Application Priority Data

Aug. 12, 1991 [JP] Japan .................................. 3-201696

[51] Int. Cl.[5] .............................................. G02B 6/36
[52] U.S. Cl. .......................................... 385/78; 385/75; 385/76; 385/77
[58] Field of Search ......................... 385/75, 76, 77, 78

[56] References Cited

U.S. PATENT DOCUMENTS

| | | | |
|---|---|---|---|
| 4,611,887 | 9/1986 | Glover et al. .......................... | 385/71 |
| 4,640,575 | 2/1987 | Dumas ................................... | 385/76 |
| 5,142,597 | 8/1992 | Mulholland et al. ................. | 385/75 |

FOREIGN PATENT DOCUMENTS

60-207106 10/1985 Japan .
63-118707 5/1988 Japan .

*Primary Examiner*—Frank Gonzalez
*Attorney, Agent, or Firm*—Staas & Halsey

[57] ABSTRACT

A housing structure for a plug-in type optical connector, comprising a housing body (1) to be fixed on a backboard, having a first opening (4) on the front surface thereof for the insertion of an optical connector (14) for an outer cable, and a cover (6) having a second opening (8) on the front surface thereof for the insertion of the optical connector (14) for the outer cable and attached to the housing body (1) to be slidable thereon up and downward between a closed position at which the second opening (8) does not coincide with the first opening (4) on the housing body (1) and an open position at which the first and second openings (4, 8) coincide with each other; the cover (6) being provided with a locking mechanism (9) which operates to retain the cover (6) at the closed position when the optical connector (14) for the outer cable is not inserted into the second opening (8) and to release the cover (6) from locking at the closed position when the optical connector (14) for the outer cable is inserted into the second opening (8) and allow the same (6) to be slidable to the open position.

6 Claims, 5 Drawing Sheets

HOUSING STRUCTURE FOR PLUG-IN TYPE CONNECTOR FOR OPTICAL FIBERS

BACKGROUND OF THE INVENTION

1. Field of the Invention

The present invention relates to a housing for accommodating a plug-in type connector for optical fibers, particularly to a protecting structure for preventing an accident caused by the erroneous operation of the connector by the operator during maintenance and inspection, as a result of which a light beam which is emitted from the connector may project into the eye of the operator.

2. Description of the Related Art

As shown in FIG. 7, in the prior art optical transmission apparatus, an optical package 20 mounted on a shelf 21 includes an optical connector 22 for receiving and connecting thereto a connector housing 24 installed on a backboard 23; electric connectors 25, 26 are thereby also connected with each other, whereby a light beam is emitted from the optical connector 22 as an optical signal. This light beam will leak out (i.e., be emitted) through an optical aperture 28 in the housing 27 which is provided for receiving an external optical connector, if such an external optical connector is not inserted into the aperture 28. This is dangerous to the human eye.

In the prior art, since the optical transmission apparatus is primarily, normally installed in an exclusive (i.e., limited access) building and dealt with by an expert operator, countermeasures for preventing such danger to an operator consist mainly of safety education of the operators and caution labels on the apparatus.

Recently, as optical transmission apparatuses have become popularized, unskilled operators often participate in the maintenance of such apparatuses, which results in an increasing possibility of accidents caused by light beams from the optical connector being emitted and striking the operator's retina. Accordingly, new countermeasures for safety, based on structural design, are eagerly desired to replace conventional safety measures which rely on the caution of the operators themselves.

SUMMARY OF THE INVENTION

A primary object of the present invention is to provide a safe housing structure for a plug-in type optical connector which allows no leakage (i.e., emission) of a light beam, even despite careless, erroneous operation.

This object is achieved by a housing structure for a plug-in type optical connector comprising a housing body to be fixed on a backboard, having a first opening on the front surface thereof for the insertion of an optical connector for an outer (i.e., external) cable, and a cover having a second opening on the front surface thereof for the insertion of the optical connector for the outer cable and attached to the housing body so as to be slidable thereon, upwardly and downwardly between a closed position at which the second opening does not coincide with the first opening on the housing body and an open position at which the first and second openings coincide with each other; the cover being provided with a locking mechanism which operates, selectively, to retain the cover at the closed position when the optical connector for the outer cable is not inserted into the second opening and to release the cover from being locked at the closed position when the optical connector for the outer cable is inserted into the second opening and thereby to allow the same to be slidable to the open position.

The locking mechanism is a box-like member which is attached to the cover and has a pair of elastic flaps arranged on the two sides thereof and each having a hook at the tip end thereof, the hooks being engageable with respective apertures in the two sides of the housing body through corresponding apertures formed on the two sides of the cover when the cover is fitted to the housing body; the flaps being resiliently displaced by the insertion of the optical connector into the second opening thereby to disengage the hooks from the apertures and so that the cover is released from the closed position and is movable to the open position.

The housing structure according to the present invention operates as follows.

When the optical connector for the outer cable is not inserted into the second opening, the cover is retained at the closed position on the housing body by the locking mechanism so that the first opening on the housing body and the second opening on the cover do not coincide with each other. Therefore, even if a light beam is erroneously emitted from an optical connector on an optical package, arranged on the back side of a backboard, it is blocked by the cover and prevented from being emitted through the back side of the backboard.

When the optical connector for the outer cable is inserted into the second opening, the locking action of the locking mechanism is released by this insertion, itself, so that the cover is slidable on the housing body. Then the optical connector is displaced together with the cover so that the second opening coincides with the first opening and the optical connector for the outer cable is aligned with the connector of the package side in preparation for completing the connection. At this stage, if a light beam is erroneously emitted from the package side optical connector, it is received by the outer cable side optical connector and does not leak outside. Finally the outer cable side optical connector is completely pushed into the package side optical connector.

BRIEF DESCRIPTION OF THE DRAWINGS

The foregoing and further objects and advantages of the present invention will be described in more detail with reference to the preferred embodiments illustrated in the attached drawings, wherein.

DESCRIPTION OF THE PREFERRED EMBODIMENTS

Figure 1:
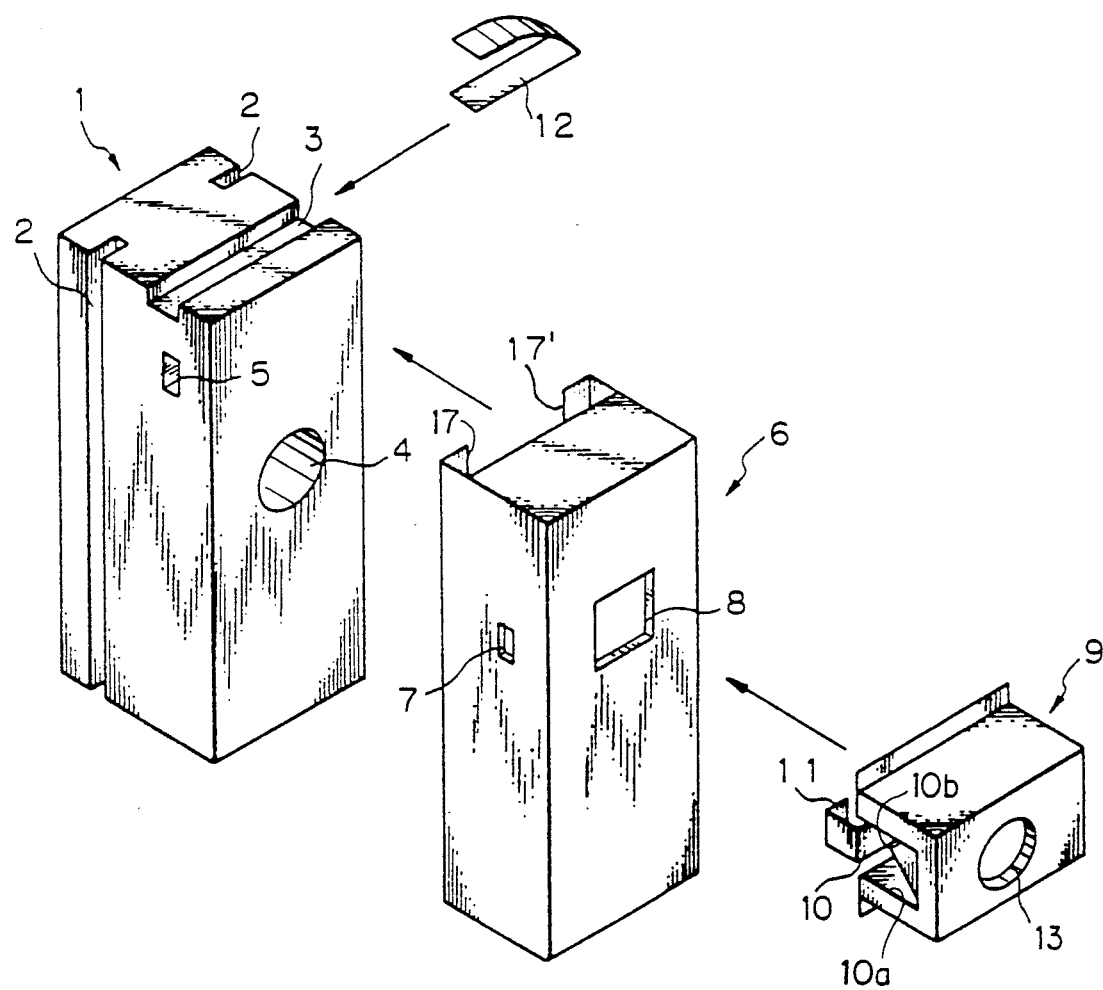
FIG. 1 is an exploded view of a preferred embodiment of a housing structure for an optical connector according to the present invention.

As shown in FIG. 1, a housing body 1 is fixed on a rear side of a backboard (not shown) for receiving an optical connector of an outer (i.e., external) cable, in a similar manner as described for the prior art. The outer shape of the housing body 1 is substantially a rectangular parallelpiped with vertical grooves 2, 2' extending the entire height of the respective, opposite side surfaces thereof and a transverse groove 3 on the top surface thereof, transverse to and spaced from the grooves 2, 2'.

A first opening 4 extends from a central area of the front surface of and into the housing body 1, for receiving an optical connector for an outer (i.e., external) cable. First apertures 5, each of a rectangular shapes, are provided on the upper area of the respective, opposite side surfaces (FIGS. 1 to 6).

Figure 5A:
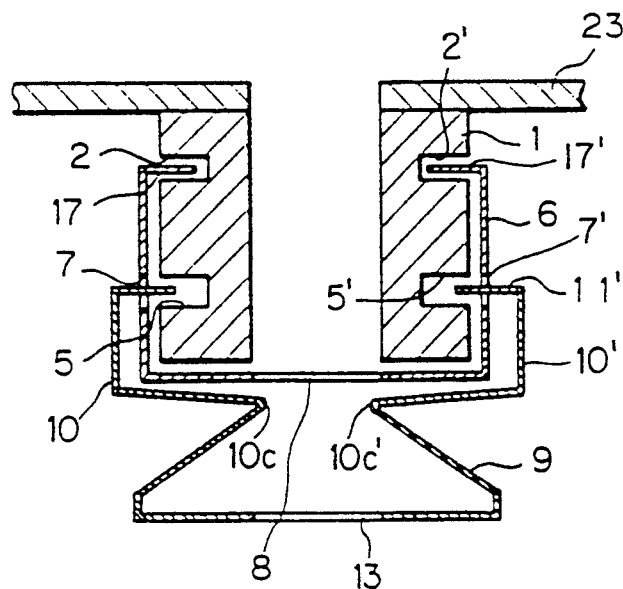
FIGS. 5A and 5B are cross-section plan views of the housing structure according to the present invention, illustrating a releasing action of the locking mechanism, responsive to the insertion of an optical connector.
Figure 5B:
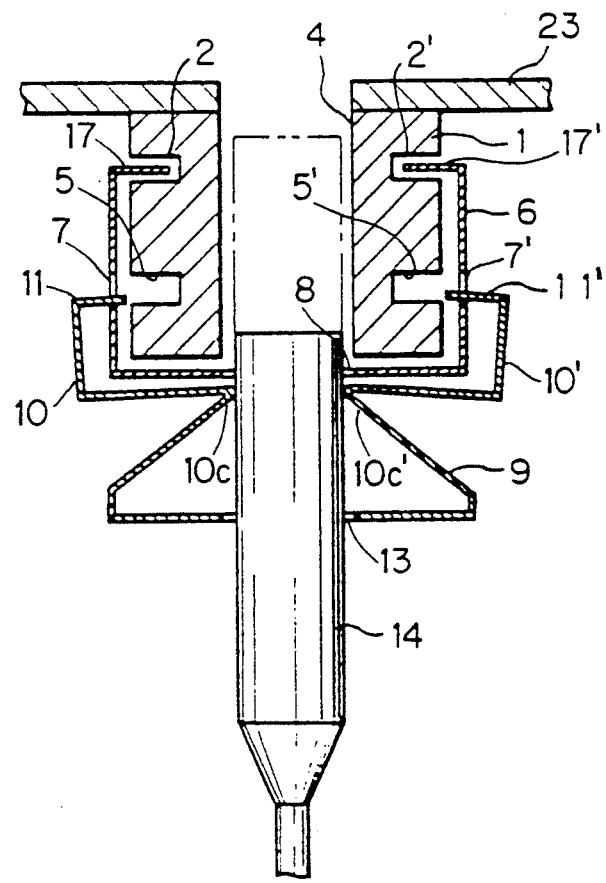
Figure 7:
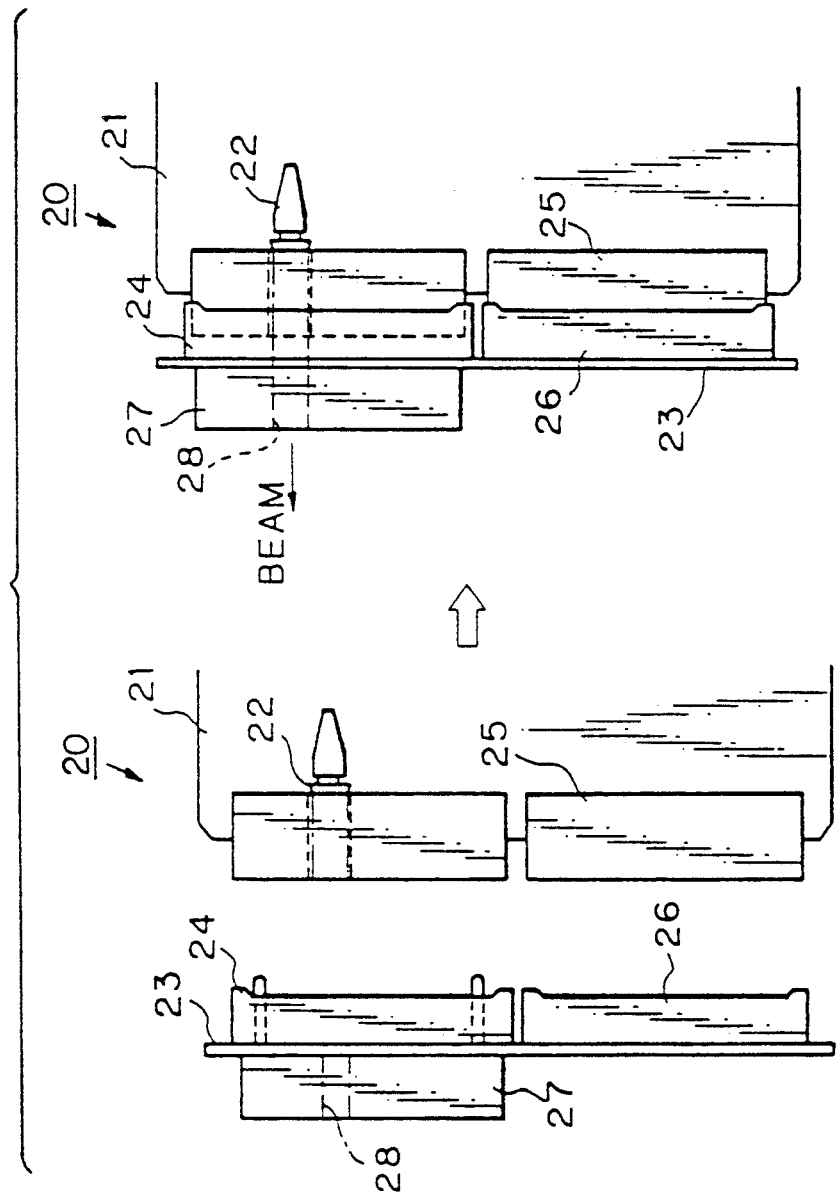
FIG. 7 is a succession of side views of a conventional optical connection housing and an external optical connector, illustrating the separate elements and the step of connection thereof.

A box-like cover 6 with open rear and lower sides is removably attached to the front surface of the housing body 1. As best seen in FIGS. 5(a) and 5(b), the rear side wall of the cover 6 is open except at the edges thereof, which edges comprise a pair of inwardly bent flange portions 17 and 17' engageable with the respective vertical grooves 2 and 2'. Further, a second opening 8 is provided in the front wall of the cover 6 in correspondence with the first opening 4, and second apertures 7 and 7' are provided in the respective side walls of the cover 6 in correspondence with the first apertures 5 and 5'. According to this structure, the cover 6 is attached to the housing body 1 from the front side of the latter, while the flanges 17, 17' thereof are engaged in the vertical grooves 2. 2', respectively, and is biased upwardly by a spring member 12 which is fitted into the transverse groove 3 and engages the interior surface of the top wall of the cover 6 (FIG. 1).

Figure 3:
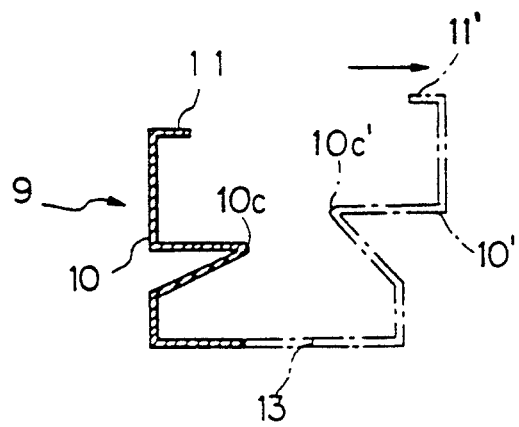
FIG. 3 is a plan view of resilient flap element of a locking mechanism, illustrating an operation thereof.

A locking mechanism 9 retains the cover 6 on the housing body 1. The locking mechanism 9 is of a substantially box-like shape with an open rear side. A third opening 13 is formed in a front wall of the locking mechanism 9 in correspondence with the first and second openings 4, 8. Each of the side walls of the locking mechanism 9 is cut along parallel lines 10a and 10b to form a corresponding flap 10 having a free end and which is resiliently connected to the respective box sidewall at the base end thereof. (FIG. 1) As shown in FIG. 3, the flaps 10 and 10' are bent, as shown in solid lines for the left side flap 10 and in chain lines for the right side flap 10' in FIG. 3, to include inward, acute angle portions 10a, 10a', respectively, and so that the respective free ends thereof have hooks 11, 11' bent inwardly at a right angle and which can be resiliently deformed by being deflected outwardly in the direction of the arrow, as shown for the right side flap 10' in FIG. 3.

The locking mechanism 9 is fitted to the front wall of the cover 6 so that the hooks 11, 11' are resiliently engaged with the second apertures 7, 7', as shown in FIG. 5(a). Thereby the locking mechanism 9 is attached to the cover 6, with the second and third openings 8, 13 coinciding, or aligned, with each other.

Figure 4:
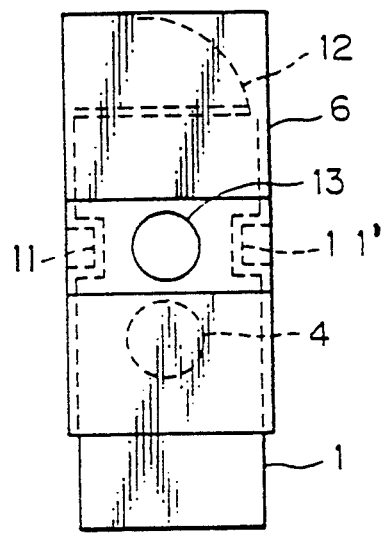
FIG. 4 is a front view of the housing structure according to the present invention, illustrating a positional relationship of the openings at the closed position.

The cover 6 together with the locking mechanism 9 is then assembled on the housing body 1 and is biased upwardly, relative to the housing body 1, by the spring member 12 (FIG. 1). so that the first apertures 5, 5' coincide (i.e., are aligned) with the second apertures 7, 7' and are engaged with the hooks 11, 11' of the locking mechanism 9 which extend through the second apertures 7, 7' into the apertures 5, 5', respectively, as shown in FIG. 5(a). That is, the cover 6 is retained, or locked, at this position by the locking mechanism 9, as shown in FIG. 4, in which the first opening 4 of the housing body 1 is disposed downwardly from the aligned, second and third openings 8 and 13 and thus is concealed (i.e., covered) by the cover 6.

Figure 2:
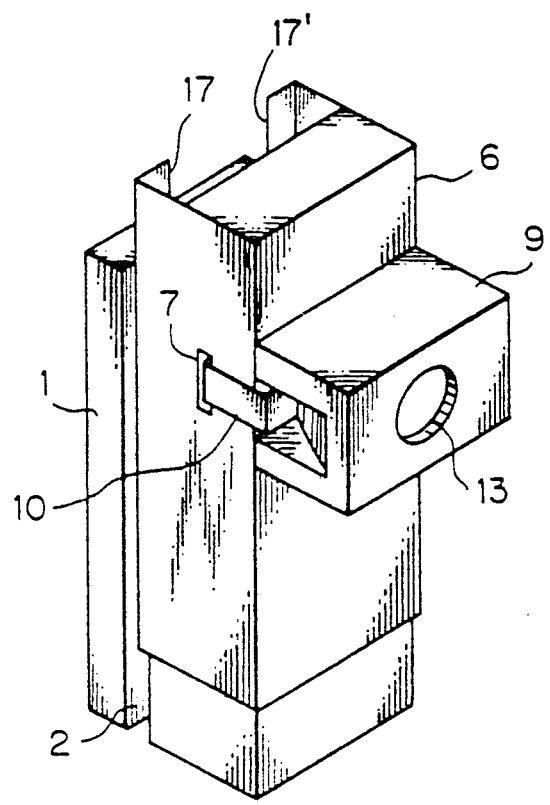
FIG. 2 is a perspective view of the housing structure shown in FIG. 1, in which a cover is at a closed position.

The housing structure thus assembled is illustrated in FIG. 2.

In this state, even if a light beam is erroneously emitted from a package side optical connector mounted on the side of the backboard 23 opposite to the first opening 4, it is blocked by the cover 6 and will never leak outside. Accordingly, this position of the cover 6 is hereinafter referred to as a "closed position".

Figure 6:
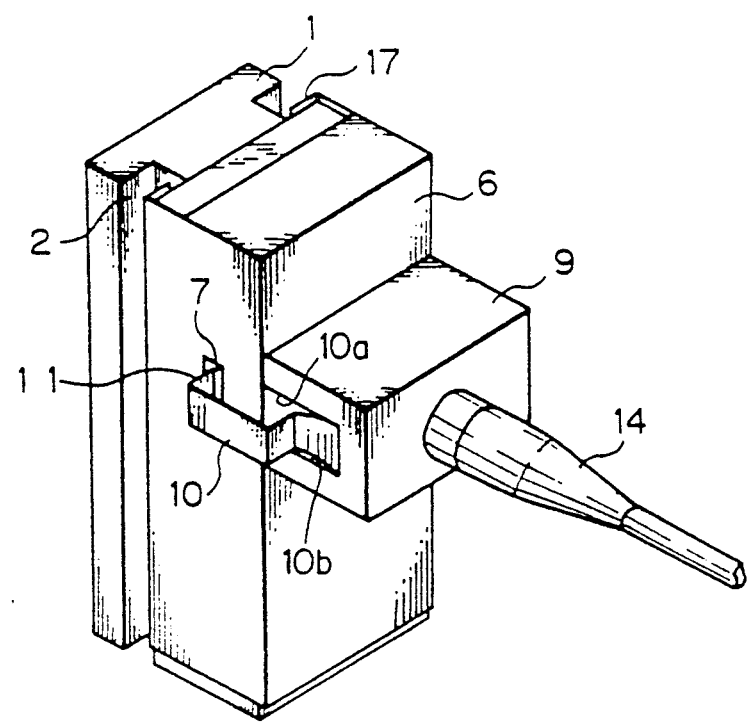
FIG. 6 is a perspective view of the housing structure according to the present invention when the connection between the two optical connectors has been completed.

At the closed position of cover 6, the optical connector 14 (FIG. 5(b)) of an outer (i.e., external) cable is then inserted into the locking mechanism 9 through the third opening 13, engaging the inward acute angle portions 10c, 10c' of the flaps 10, 10' and the latter thereby being pushed apart in a sideward, or outward, direction by the connector body as shown in FIG. 5(b), whereby the hooks 11, 11' are disengaged from the first apertures 5 and 5', thereby to release the locking engagement, by locking mechanism 9, of the cover 6 with the body 1. Thus, the cover 6 can be displaced upwardly and downwardly along the vertical grooves 2, 2' of the housing body 1. After the cover 6 is pushed down against the biasing force of the spring member 12 so that the (aligned) second and third openings 8 and 13 are aligned with the first opening 4, the optical connector 14 is further pushed through the first opening 4 until it is completely engaged with the package side optical connector (not shown) and thus to the position shown by a chain line in FIG. 5(b). This state is also illustrated in FIG. 6.

As stated above, according to the present invention, by the application of a cover and a locking mechanism of a special structure to a housing body of an optical connector for an outer (i.e., external) cable, a light beam erroneously emitted from the package side optical connector is always blocked by the cover, even if the outer (i.e., external) cable side optical connector is not connected with the package side optical connector. Thus, accidents caused by leakage of a light beam due to careless operation of an operator are completely avoided.

What is claimed is:

1. A housing structure for a plug-in type connector, comprising:

a housing body having front and rear surfaces and an aperture extending therethrough, substantially transversely to the front and rear surfaces and defining a corresponding first opening in the front surface thereof, the aperture receiving and mounting therewithin, from the rear surface, a first optical connector element and receiving therewithin, from the front surface, a second, external optical connector element to be interconnected with the first optical connector element, a light beam emitted from the first optical connector element being transmitted through the opening and exteriorly of the front surface in the absence of a second optical connector element being received within the aperture from the first opening;

a cover having a front wall with a second opening therein, the cover being mounted in sliding relationship on, and relatively to, the housing body and being selectively movable between an open position in which the first and second openings are in alignment and a closed position in which the first and second openings are displaced and the cover front wall thereby covers the first opening; and locking means for normally locking the cover at the closed position, said locking means being responsive to the insertion of a second optical connector thereinto, for releasing the cover from the closed position and permitting the cover to slide to the open position thereof in which the first and second openings are aligned, thereby affording access to the aperture for insertion of the second connector element into the aperture and interconnection thereof, within the aperture, with a first optical connector element.

2. A housing structure as recited in claim 1, wherein the locking means comprises:

a box-like element having a front wall and at least a first pair of first and second sidewalls including respective first and second flaps, each flap having a first end resiliently interconnected with the corresponding sidewall and a free end, the front wall furthermore having a third opening therein and the box-like element being mounted on the front wall of the cover with the respective front walls of the box-like element and the cover in substantially parallel relationship and the respective second and third openings thereof in alignment;

the first and second flaps being inwardly biased to maintain the box-like element in position on the cover and, further, engaging the housing in the closed position of the cover to lock the cover in the closed position, the flaps being responsive to the insertion of the second connector element through the third opening in the front wall of the box-like element for deflecting the respective free ends of the first and second flaps thereby to release the cover from the closed position and thereby to permit the cover to be slid to the open position.

3. A housing structure as recited in claim 2, wherein:

the housing body further comprises first and second sidewalls respectively interconnecting the front and rear surfaces thereof and having corresponding apertures therein;

the cover further comprises first and second sidewalls parallel to the first and second sidewalls of the housing body and having respective apertures therein which are disposed in alignment with the corresponding apertures in the first and second sidewalls of the housing body when the cover is in the closed position;

the respective free ends of the first and second flaps being received through the corresponding and aligned, respective apertures of the respective first and second sidewalls of the cover and the housing body in the closed position of the cover thereby to normally lock the cover at the closed position, the insertion of the second connector displacing the first and second flaps outwardly for displacing same from within the respective apertures in the first and second sidewalls of the housing body while maintaining the free ends disposed within the respective apertures of the first and second sidewalls of the cover thereby maintaining the box-like element, mounted on the cover, but permitting the cover to be slid from the closed and to the open position.

4. A housing structure as recited in claim 3, wherein:

the first and second flaps have respective, inwardly extending portions, intermediate the ends of each, and which are resiliently, inwardly biased toward each other so as to define a restricted passageway between the aligned second and third openings, the insertion of the second connector element through the third opening and into the restricted passageway engaging and thereby displacing outwardly the first and second flaps and thereby withdrawing the respective free ends thereof from within the apertures in the first and second sidewalls of the housing body.

5. A housing structure as recited in claim 4, further comprising:

a spring member interconnecting the housing body and the cover and resiliently biasing the cover to the closed position.

6. A housing structure as recited in claim 1, wherein:

the housing body further comprises a pair of first and second sidewalls interconnecting the front and rear surfaces thereof and having corresponding first and second grooves therein;

the cover further comprises a pair of first and second sidewalls extending from the cover front wall and disposed so as to be in parallel relationship and closely adjacent to the respective first and second sidewalls of the housing body when the cover is assembled on the housing, the respective first and second sidewalls of the cover further comprising inwardly directed flanges received in the first and second grooves in the respective first and second sidewalls of the housing body for guiding the cover relative to the housing body when moving the cover between the opened and closed positions.

* * * * *